United States Patent [19]
Kim

[11] Patent Number: 5,818,184
[45] Date of Patent: Oct. 6, 1998

[54] SLED MOTOR SLIDING PREVENTION CIRCUIT

[75] Inventor: Gee-bong Kim, Suwon, DPR of Korea

[73] Assignee: Samsung Electronics Co., Ltd., Kyungki-do, Rep. of Korea

[21] Appl. No.: 231,179

[22] Filed: Apr. 22, 1994

[30] Foreign Application Priority Data

May 26, 1993 [KR] Rep. of Korea .................. 93-9192

[51] Int. Cl.⁶ .............................. H02P 3/12; G11B 5/596
[52] U.S. Cl. ....................... 318/375; 318/380; 360/78.04
[58] Field of Search .................. 318/375, 379, 318/560–567, 380, 759–761; 317/138, 439, 254, 696, 685; 380/78.04–78.15, 75, 73.01–73.14

[56] References Cited

U.S. PATENT DOCUMENTS

| | | | |
|---|---|---|---|
| Re. 34,399 | 10/1993 | Gami et al. .......................... | 360/73.01 |
| 4,237,501 | 12/1980 | Barmache et al. ........................ | 360/75 |
| 4,319,171 | 3/1982 | Motoori .................................. | 318/379 |
| 4,367,435 | 1/1983 | Bailey et al. ............................ | 318/257 |
| 4,609,954 | 9/1986 | Bolton et al. ......................... | 360/78.06 |
| 4,816,726 | 3/1989 | Novis et al. ........................... | 318/293 |
| 4,879,612 | 11/1989 | Freeze et al. ........................ | 360/78.06 |
| 4,885,517 | 12/1989 | Pennock ................................. | 318/678 |
| 5,095,254 | 3/1992 | Ueki ....................................... | 318/138 |
| 5,142,516 | 8/1992 | Fennema .............................. | 369/44.28 |
| 5,291,106 | 3/1994 | Murty et al. .......................... | 318/375 |
| 5,311,107 | 5/1994 | Shimegi et al. ...................... | 318/369 |
| 5,361,022 | 11/1994 | Brown .................................... | 318/375 |

*Primary Examiner*—Brian Sircus
*Attorney, Agent, or Firm*—Sughrue, Mion, Zinn, Macpeak & Seas, PLLC

[57] ABSTRACT

A sled motor sliding prevention circuit prevents the sled motor from sliding during track tracing so as to enable the optical disk driving apparatus to perform high speed accessing. The inverse electromotive force occurring when the sled motor stops is removed by selectively grounding each terminal of the sled motor, so that the motor does not continue to be driven by the inverse electromotive force. Therefore, high speed access in an optical disk driving apparatus can be accomplished.

12 Claims, 3 Drawing Sheets

SLED MOTOR SLIDING PREVENTION CIRCUIT

BACKGROUND OF THE INVENTION

The present invention relates to a servo control circuit of an optical disk driving apparatus, and more particularly to a sled motor sliding prevention circuit for preventing the sliding of the sled motor during track tracing so as to enable the optical disk driving apparatus to perform high speed accessing.

Generally, examples of methods for transporting the beam spot of an optical disk apparatus, such as a CD-ROM and compact disk player (CDP), include a tracking jump method, which moves the objective lens, and a sled transport method, which moves the sled on which the pick up optical elements, including the objective lens, is located. Such methods and apparatus are classified, respectively, as a microscopic tracking servo and method for tracking the compact disk by moving the objective lens, and a sled servo (also referred to as a feed servo) and method for tracking by movement of the pickup itself.

In CD-ROMs, the search speed for the information loaded on the disk is considered very important, whereas the same is not true for CDPs. Where the achievement of high speed access of the optical disk driving apparatus is important, it is necessary to prevent pickup sliding, which can occur at the moment of track jumping or track movement.

Accordingly, it is important to control the sled motor moving the pickup and to drive the sled motor in a way to decrease the access time. It is important to stop the sled motor immediately after the microcomputer 11 (FIG. 1) applies a stop signal to motor driver 14, to thereby locate the pickup accurately at the target postion, which enables the proper termination of the reading operation. FIG. 1 is a block diagram showing a sled motor servo circuit in a conventional optical disk apparatus. The conventional sled motor servo circuit comprises a microcomputer 11 for outputting a motor driving control signal, a signal processor 12 for processing and phase-synchronizing the output signal of microcomputer 11, a servo controller 13 for outputting a servo control signal as a voltage signal according to the motor driving control signal, and a motor driver 14 for driving a sled motor M.

The microcomputer 11 produces the driving control signal for controlling every servo, e.g., the tracking motor, the focusing motor and the sled motor, to provide track movement, track jump and normal reproduction. Signal processor 12 processes and phase-synchronizes the signal of microcomputer 11. Servo controller 13 produces a control in the form of a voltage signal for controlling the motor, which is driven corresponding to the track movement, track jump and normal reproduction. Motor driver 14 connected to sled motor M drives the sled motor M according to the control signal generated by servo signal controller 13. As an example, a direct current (DC) motor is used as sled motor M.

One problem with the conventional sled motor servo circuit is that when a driving stop voltage is applied for the purpose of stopping the motor while it is in rotation, the motor will continue to rotate for a predetermined duration due to rotation inertia before it ultimately stops. As a result the pickup will stop at a position past the real target spot. Therefore, accurate high speed accessing is not accomplished.

SUMMARY OF THE INVENTION

Therefore, it is an object of the present invention to provide a sled motor sliding prevention circuit which solves the above problem by controlling the sled motor to prevent it from moving past a target stop position during a track jump or track movement operation.

To accomplish the above object, the present invention provides a sled motor sliding preventing circuit and method in an optical disk apparatus, the circuit comprising:

a microcomputer outputting a driving control signal for controlling every servo according to each operation mode;

signal processing means for producing a control signal as a voltage signal to control the motor driving corresponding to the driving mode according to the driving control signal;

motor driving means connected to a sled motor and driving the sled motor according to the control signal; and inverse electromotive force preventing means for preventing the generation of the inverse electromotive force by selectively connecting one input terminal of the sled motor to ground according to the driving direction of the motor when the sled motor stops.

BRIEF DESCRIPTION OF THE DRAWINGS

The above objects and other advantages of the present invention will become more apparent from the following detailed description of a preferred embodiment thereof in conjunction with the attached drawings, in which.

DETAILED DESCRIPTION OF THE INVENTION

Figure 1:
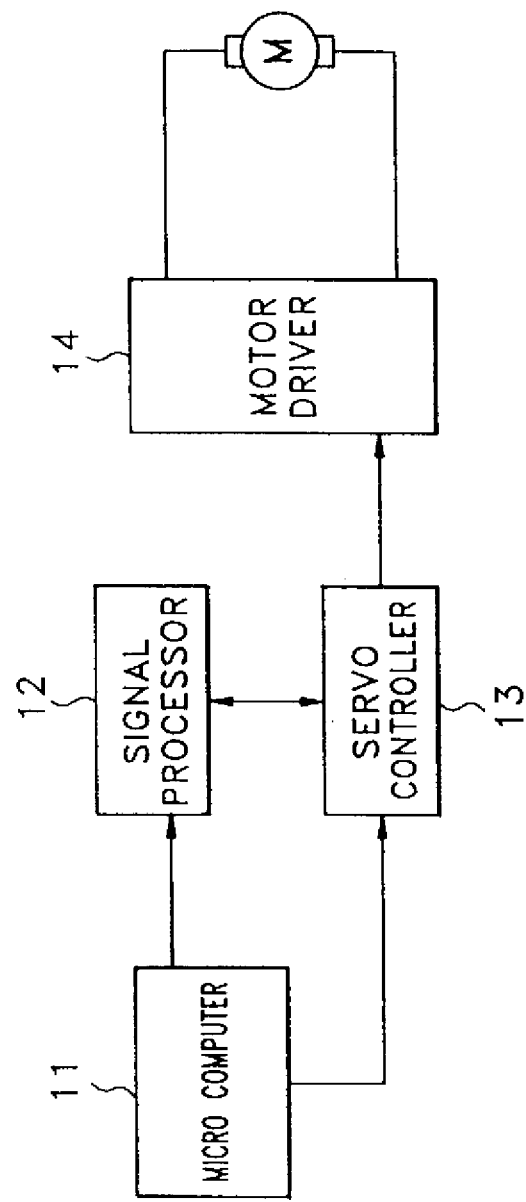
FIG. 1 is a block diagram of a conventional sled motor servo circuit in an optical disk apparatus.
Figure 2:
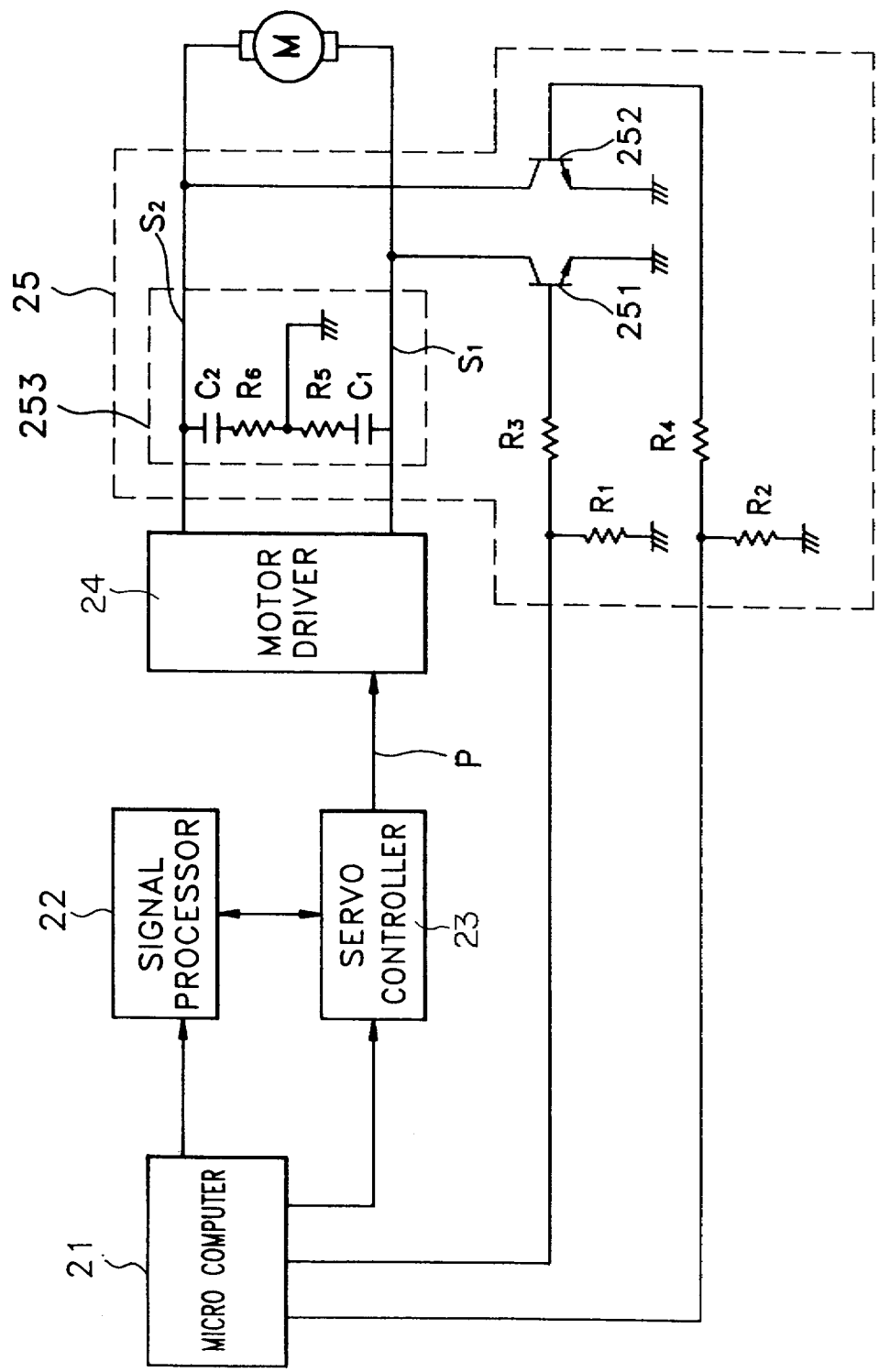
FIG. 2 is a circuit diagram showing a sled motor sliding prevention circuit according to an embodiment of the present invention.

Referring to FIG. 2, the circuit comprises a microcomputer 21 for outputting a driving control signal which controls each servo of the optical disk driving apparatus according to the operation mode of the respective servos, a signal processor 22 for processing and phase-synchronizing the output signal of the microcomputer, a servo controller 23 for outputting the control signal as a voltage signal for controlling the motor drive in accordance with the drive control signal, a sled motor driver 24 and a sled motor M connected thereto for being driven by the driver. These elements are also common to the conventional sled motor driving circuit.

The sled motor driving circuit of the present invention further includes an inverse electromotive force preventing circuit 25 for preventing the generation of an inverse electromotive force by selectively connecting first and second terminals of the sled motor to ground when the sled motor is driven in either direction and stops. The inverse electromotive force preventing circuit 25 comprises first switch 251 connected between a first terminal S1 of sled motor M and ground for grounding first terminal S1 under control of microcomputer 21 when the inverse electromotive force occurs after the sled motor is driven in a normal direction to stop; second switch 252 connected between a second terminal S2 of sled motor M and ground for grounding second terminal S2 under control of microcomputer 21 when the inverse electromotive force occurs after the sled motor is driven in an opposite direction to stop; a first resistor R1 connected between the driving signal input port of the first switch 251 and ground; a second resistor R2 connected between the driving signal input port of the second switch 252 and ground; a third resistor R3 for supplying the first switch 251 with a driving signal; a fourth resistor R4 for supplying the second switch 252 with a driving signal; and an RF noise removing circuit 253 installed between each port of sled motor M and ground. The first and second switches 251 and 252 may be, for example, CMOS transfer gates or bipolar transistors.

The RF noise removing circuit 253 comprises a first condenser C1 and fifth resistor R5 both connected in a series to the first terminal S1 of the sled motor M and a second condenser C2 and sixth resistor R6 connected in a series to the second terminal S2 of the sled motor M.

Figure 3A:
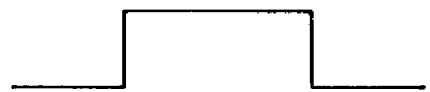
FIGS. 3A–3F show operational waveforms at various parts of the sled motor sliding prevention circuit of the present invention.
Figure 3B:
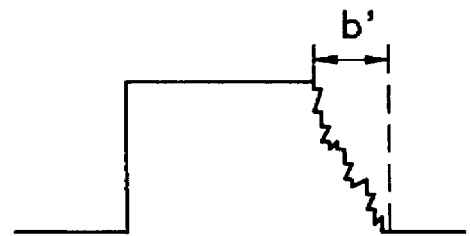
Figure 3C:
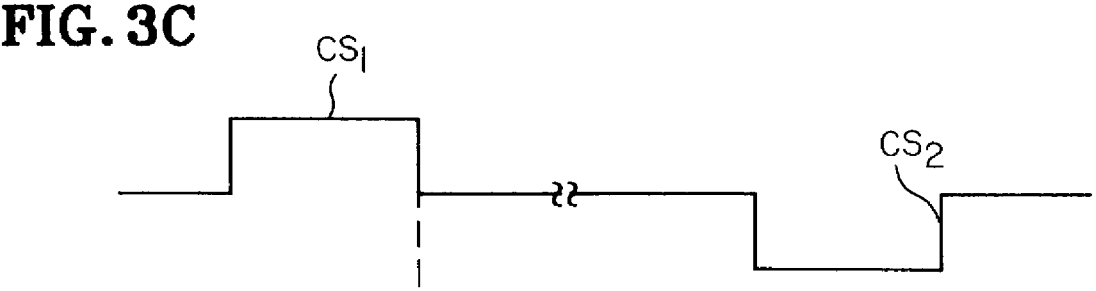
Figure 3D:
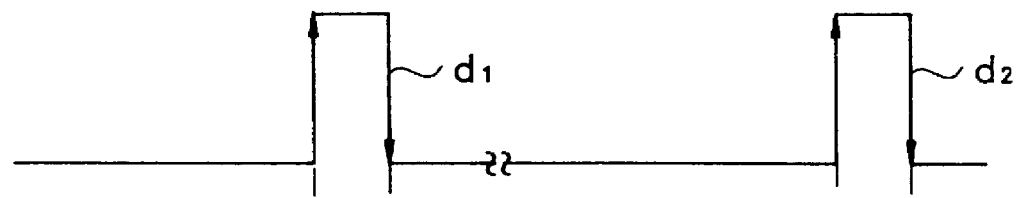
Figure 3E:
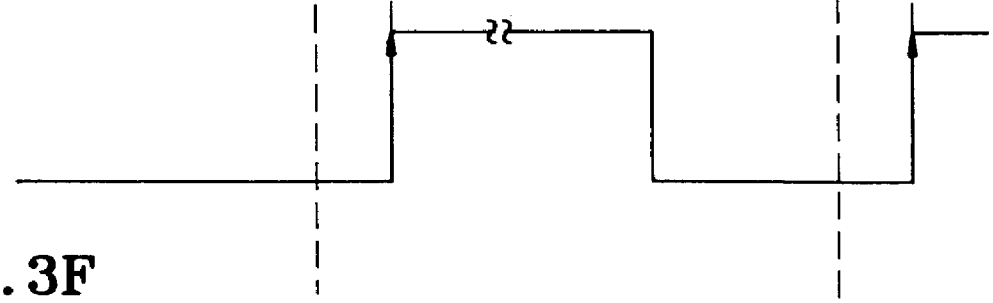
Figure 3F:
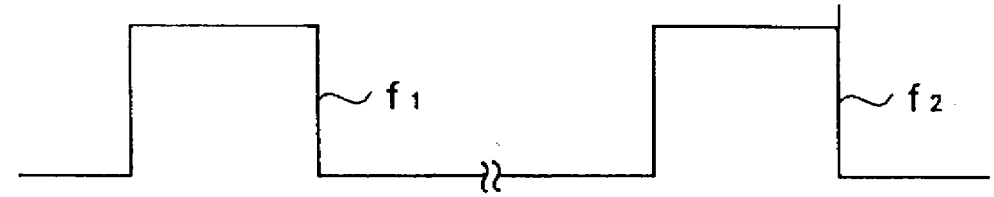

FIG. 3A shows the sled motor driving signal generated by servo controller 23. The waveform of FIG. 3B represents the inverse electromotive force generated by the sled motor M when it is driven according to the driving signal of FIG. 3A. FIG. 3C shows a waveform generated by microcomputer 21 and applied to the signal processor 22. The exact form of the waveform of FIG. 3C depends upon the driving direction of sled motor M. The two waveforms CS1 and CS2 are for controlling the sled motor to move the pickup from an inner track to an outer track, and to move the pickup from an outer track to an inner track, respectively. FIG. 3D shows the slide preventing signal which is produced for an interval after sled motor M is supposed to stop and lasts until the phase is locked. The signal d1 denotes the waveform of the slide preventing signal generated by microcomputer 21 when the pickup is moved from the current location to the outer track, and the signal d2 denotes the waveform of the slide preventing signal generated by microcomputer 21 when the pickup is moved from the current location to the inner track. FIG. 3E shows the waveform of the signal generated by the phase lock after the sled motor M stops. FIG. 3F shows a driving waveform for the sled motor M. This waveform, from which the inverse electromotive force is removed, is generated by the motor driver in accordance with the motor driving signal shown in FIG. 3C.

Next, the operation of the sled motor slide preventing circuit according to the present invention shown in FIG. 2 will be described with reference to the waveforms of FIG. 3.

The microcomputer 21 supplies servo controller 23 with a control signal corresponding to each selected mode of track transportation, track jump and normal reproduction, via signal processor 22. The servo controller 23 outputs a driving signal corresponding to the control signal via an SLO port P. Then, motor driver 24 generates and outputs a driving voltage for the sled motor M.

When the sled motor 24 is driven by such a method, the microcomputer 21 recognizes the target spot by counting the number of tracks to the target spot and blocks the driving signal for the sled motor M when the sled motor reaches the target spot. At this time, the sled motor M is unable to stop immediately after the blocking of the signal, but continues its rotation for a predetermined duration due to rotational inertia, resulting in the generation of an inverse electromotive force. The inverse electromotive force that is generated is illustrated as waveform b' of FIG. 3B. Since the inverse electromotive force is greater than the initial driving voltage of sled motor M, the sled motor M continues its rotation so that, in reality, the pickup moves more than 1,000 tracks.

To solve such problem, when the pickup moves from an inner track to an outer track, the microcomputer 21 generates signal CS1 for driving the sled motor and counts the number of tracks up to the target spot. Then, after the pickup reaches the target spot, the motor driving signal is blocked: that is, when signal CS1 (FIG. 3C) changes from high to low, signal d1 (FIG. 3D) is generated. This signal is applied to the first switch 251 of inverse electromotive force preventing circuit 25, causing the switch to turn on and thereby ground the first terminal S1 of sled motor M. During the movement of the pickup from an inner track to an outer track, since the second terminal S2 stays grounded, the first and second terminals S1 and S2 of the sled motor M are grounded so that sled motor M stops. Then, when the signal indicating that the rotation number of the sled motor M is locked is produced by signal processor 22, microcomputer 21 produces the trailing edge of the signal d1 as shown.

It is noted that terminals S1 and S2 are initially grounded and the pickup is in a stopped state prior to the introduction of any movement. If the pickup is moved from an inner track toward an outer track, the motor is driven in a normal direction and the first switching means 251 is opened so that the first terminal S1 is no longer grounded and the normal direction driving signal is conveyed to motor M. Then for the motor to stop, first terminal S1 is again grounded via first switch 251. Accordingly, in the phase-locked condition, where the pickup is not moving, both terminals remain grounded. On the other hand, if the pickup is deemed to move from an outer track toward an inner track, the second switch 252 is opened so that the second terminal S2 is no longer grounded and the inverse direction driving signal is sent to the motor.

When the pickup moves from the an outer track to an inner track, the microcomputer 21 produces signal CS2, and motor driver 24 generates signal f2 for driving sled motor M according to signal CS2 and then outputs the signal via second terminal S2 of the sled motor. First terminal S1 remains grounded. Microcomputer 21 produces the stop signal for stopping the sled motor M at the stop point and simultaneously produces signal d2, which is applied to the switch 252 to ground the second terminal S2. Accordingly, both terminals of sled motor M are grounded so that the inverse electromotive force of the sled motor M can be prevented.

The RF noise removing circuit 253, including first condenser C1 and fifth resistor R5 which are connected in series to first terminal S1 of sled is motor M, and second condenser C2 and sixth resistor R6 which are connected in series to second terminal S2 of sled motor M, removes the RF noise which may be applied to sled motor M.

Accordingly, the sled motor sliding prevention circuit of the present invention selectively grounds each terminal of the sled motor in order to remove the inverse electromotive force generated when the sled motor stops. Therefore, motor drive due to the inverse electromotive force can be prevented so as to provide an excellent effect in high speed accessing for the optical disk driving apparatus.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. In an optical disk apparatus of the type having a sled motor for moving an optical head relative to an optical disk, a microcomputer outputting a driving control signal for controlling servo systems of the optical disk apparatus in accordance with the particular operation modes of said servo systems, a signal processor for producing a control signal as a voltage signal to control the driving of the sled motor in accordance with said driving control signal, and a motor driver connected to said sled motor for driving said sled motor according to said control signal to move said optical head from a starting position to a targeted position of said optical disk; the improvement comprising a sled motor sliding prevention circuit comprising:

an inverse electromotive force preventing circuit for selectively grounding input terminals of said sled motor for stopping said sled motor when said sled motor has moved said optical head to said targeted position, wherein said input terminals are selectively grounded depending on the driving direction of said sled motor under the control of said microcomputer, wherein the grounding of said input terminals blocks an inverse electromotive force from driving said sled motor, and wherein said inverse electromotive force would otherwise cause said optical head to move substantially past said targeted position by continuing to rotate said sled motor after a stop command has been output from said microcomputer; and an RF noise removing circuit connected between said one and second terminals of said sled motor and ground.

2. A sled motor sliding prevention circuit as claimed in claim 1, wherein said inverse electromotive force preventing circuit comprises:

a first switch connected between one terminal of said sled motor and ground, wherein said first switch is responsive to a first control signal from said microcomputer for grounding said one terminal, and wherein said first control signal is generated at said stop command when said sled motor is driven in a first direction; and a second switch connected between a second terminal of said sled motor and ground, wherein said second switch is responsive to a second control signal from said microcomputer for grounding said second terminal, and wherein said second control signal is generated at said stop command when said sled motor is driven in a second direction.

3. A sled motor sliding prevention circuit as claimed in claim 2, wherein said first switch is a CMOS transfer gate.

4. A sled motor sliding prevention circuit as claimed in claim 2, wherein said first switch is a bipolar transistor.

5. A sled motor sliding prevention circuit as claimed in claim 2, wherein said second switch is a CMOS transfer gate.

6. A sled motor sliding prevention circuit as claimed in claim 2, wherein said second switch is a bipolar transistor.

7. A sled motor sliding prevention circuit as claimed in claim 1, wherein said RF noise removing circuit comprises:

a first condenser and a first resistor connected in a series between said one terminal of said sled motor and ground; and a second condenser and a second resistor connected in a series between said second terminal of said sled motor and ground.

8. An optical disk driving apparatus comprising:

a sled motor for moving an optical head relative to an optical disk, wherein said sled motor has first and second terminals;

microcomputer controlled circuitry for driving said sled motor in first and second directions and to a stop under command of microcomputer generated control signals, wherein said microcomputer controlled circuitry drives said sled motor in order to move said optical head from a starting position to a targeted position of said optical disk;

means responsive to a stop command from said microcomputer for blocking an inverse electromotive force normally generated by said sled motor at an initiation of said stop command from said microcomputer, whereby said sled motor can be brought to a stop at approximately said targeted position without additional rotation due to said inverse electromotive force; and an RF noise removing circuit connected between said first and second terminals of said sled motor and ground.

9. An optical disk driving apparatus as claimed in claim 8, and wherein said sled motor is driven in said first direction by application of a microcomputer generated driving signal to said first terminal while said second terminal is grounded, and wherein said sled motor is driven in said second direction by application of a microcomputer generated driving signal to said second terminal while said first terminal is grounded, and wherein said means responsive to a stop command comprises:

a first switch connected between said first terminal and ground, and a second switch connected between said second terminal and ground;

means in said microcomputer for applying a control signal to said first switch, when said sled motor is to be driven from said first direction to a stop, to cause said first switch to ground said first terminal; and means in said microcomputer for applying a control signal to said second switch, when said sled motor is to be driven from said second direction to a stop, to cause said second switch to ground said second terminal.

10. An optical disk driving apparatus as claimed in claim 9, wherein said RF noise removing circuit comprises:

a first condenser and a first resistor connected in a series between said first terminal of said sled motor and ground; and a second condenser and a second resistor connected in a series between said second terminal of said sled motor and ground.

11. In an optical disk apparatus of the type having a sled motor for moving an optical head relative to an optical disk, a microcomputer outputting a driving control signal for controlling the servo systems of said optical disk apparatus in accordance with the particular operation modes of said servo systems, a signal processor for producing a control signal as a voltage signal to control the driving of the sled motor in accordance with said driving control signal, a motor driver connected to said sled motor for driving said sled motor according to said control signal to move said optical head from a starting position to a targeted position of said optical disk, and an RF noise removing circuit connected between first and second terminals of said sled motor and ground; a method for preventing sled motor slide comprising:

selectively grounding input terminals of said sled motor at the time of stopping said sled motor, wherein said input terminals are selectively grounded depending on the driving direction of said sled motor under the control of said microcomputer, wherein the grounding of said input terminals blocks an inverse electromotive force from driving said sled motor, and wherein said inverse electromotive force would otherwise cause said optical head to move substantially past said targeted position by continuing to rotate of said sled motor after a stop instruction has been output from said microcomputer; and removing noise via said RF noise removing circuit.

12. The method of claim 11, wherein the step of selectively grounding comprises:

grounding a first terminal of said sled motor when said sled motor is driven from a normal driving direction to a stop; and grounding a second terminal of said sled motor when said sled motor is driven from a reverse driving direction to a stop.

* * * * *